Feb. 16, 1971  J. RAY  3,562,901

METHOD OF MANUFACTURING PNEUMATIC EQUILIBRATOR ASSEMBLY

Filed Jan. 13, 1969  2 Sheets-Sheet 1

INVENTOR

JOSEPH RAY

BY Cushman, Darby & Cushman

ATTORNEY

Feb. 16, 1971 J. RAY 3,562,901
METHOD OF MANUFACTURING PNEUMATIC EQUILIBRATOR ASSEMBLY
Filed Jan. 13, 1969 2 Sheets-Sheet 2
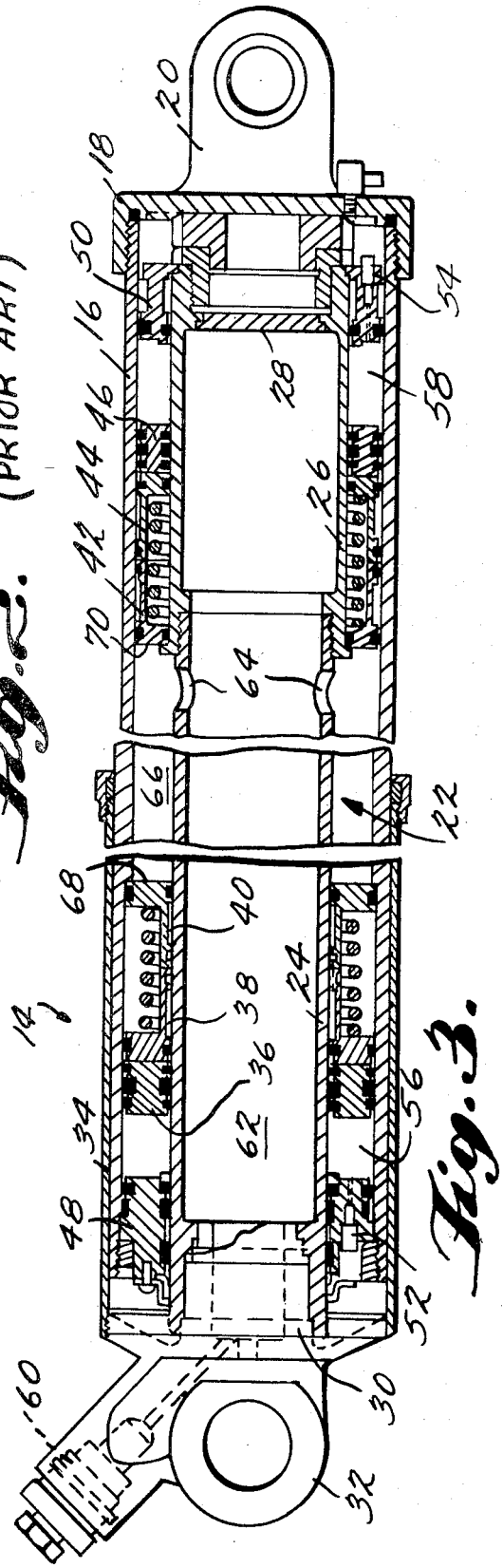
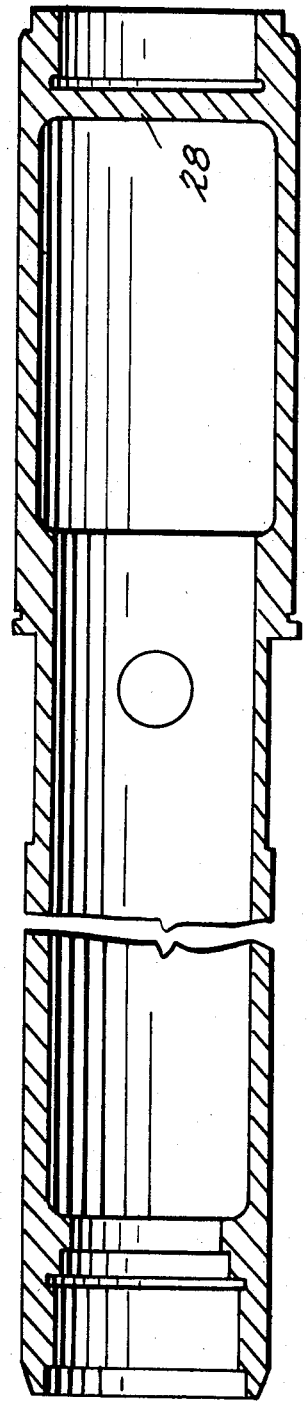
INVENTOR
JOSEPH RAY
BY Cushman, Darby & Cushman
ATTORNEYS

United States Patent Office 3,562,901
Patented Feb. 16, 1971

3,562,901
METHOD OF MANUFACTURING PNEUMATIC EQUILIBRATOR ASSEMBLY
Joseph Ray, 566 E. Fulton St.,
Long Beach, N.Y. 11561
Filed Jan. 13, 1969, Ser. No. 790,790
Int. Cl. B23p 13/04
U.S. Cl. 29—558                                                   2 Claims

ABSTRACT OF THE DISCLOSURE

A pneumatic equilibrator assembly for balancing the weight of a gun muzzle is provided with a tubular plunger assembly formed as a monolithic, unitary structure from a forging quality material. The monolithic, unitary structure of the plunger assembly is impermeable to gas under pressure, thereby eliminating the danger of a loss of pressurizing gas (such as nitrogen gas) through defects which might otherwise arise from brazed or multiple-piece constructions for plunger assemblies. The improved plunger assembly is formed by boring internal openings into opposite ends of a cylindrical blank, machining a major part of the outside surface of the blank to a desired diameter but leaving an excess of thickness of material at an open end of the blank, and pressure forging the end of the blank having the excess material so as to simultaneously reduce its inside and outside diameters.

BRIEF DESCRIPTION OF INVENTION

This invention relates to an improved pneumatic equilibrator assembly having a monolithic, unitary plunger which is stronger and less permeable to gas leakage than prior assemblies. The improved equilibrator of this invention is useful as a balancing means for guns which are mounted in carriages, and the invention provides for an assembly which can be easily manufactured to meet Defense Department requirements while at the same time eliminating dangers of structural disassociation and gas leakage which have existed with prior assemblies.

Pneumatic equilibrators are well known in the art as devices which function to balance the weight of a gun muzzle so as to reduce work effort required to move the gun relative to a carriage in which it is mounted. Basically, a pneumatic equilibrator comprises a tubular casing in which a tubular plunger assembly is received for movement relative to the casing. The equilibrator assembly is filled with nitrogen gas under pressure and is provided with seals to retain the gas while at the same time allowing a telescoping movement of the tubular plunger assembly relative to the tubular casing. The Defense Department of the United States has established certain standards of manufacture for military equilibrator assemblies, and one important standard requires that the plunger assembly be provided with a closed end wall which allows no leakage of nitrogen gas under pressure. Prior attempts to form plunger assemblies from a single, unitary piece of material have been unsuccessful in meeting the leakage tests which are applied to the closed end wall portions of the plunger assemblies, and in fact, present day manufacturing procedures completely avoid any attempts to manufacture the plunger assembly portion of an equilibrator from a single blank of material. In accordance with present prior art practice, plunger assemblies are manufactured from several pieces which are joined together to meet Defense Department requirements of preciseness of concentricity, non-leakage of the closed end portion of the plunger assembly, and configuration of the overall equilibrator assembly. The important end wall portion of the plunger assembly has been manufactured by brazing a separate piece of metal to one end of a tubular section. This procedure has been followed to provide a specific characteristic of a closed end wall which is impervious to nitrogen gas under pressure, however, it has been found to be very difficult to obtain a satisfactory brazed joint in the end wall portion. Typically, there are a large number of rejects of assemblies as a result of imperfect brazing procedures, and, in addition, there are failures of brazed joints during actual service of the equilibrators, thereby causing malfunctions of the equilibrators or of a gun which is being balanced.

In accordance with the present invention, it has been discovered that an improved plunger assembly for an equilibrator can be manufactured from a single blank of material in a manner which will meet all Defense Department requirements as to preciseness of concentricity, imperviousness to nitrogen gas under pressure, and configuration of the overall assembly. It has been found that prior attempts to form a closed end wall as an integral part of a plunger assembly have allowed a passage and leakage of nitrogen gas directly through the crystalline structure of the material from which such plunger assemblies have been manufactured. The present invention overcomes this problem by manufacturing the plunger assembly from a forging grade of steel and by a novel process which provides an impervious closed end to the plunger assembly. The process of the present invention eliminates any requirement for brazing an end piece into a plunger assembly, and yet, a closed end wall is formed which is impervious to nitrogen gas. The process of forming the improved plunger assembly of this invention involves the steps of boring internal openings into opposite ends of a cylindrical blank of forging quality steel. The internal openings are bored along the central longitudinal axis of the blank and are formed with unequal lengths so as to leave a closed wall portion within the blank at a point which is near one end of the cylindrical blank.

Another Defense Department requirement for plunger assemblies of this type sets very high standards for tolerances which assure a precise alignment of all portions of an equilibrator under load conditions. The plunger assembly of an equilibrator is carried within a tubular casing by bearing rings which are in sliding engagament with an internal surface of a tubular casing. Since normal usage of the equilibrator involves substantial load, shock and vibration forces, it is necessary that all moving portions of the equilibrator be carefully and precisely aligned and concentric with one another. The standard of alignment is attained by requiring that all slidable surfaces of the plunger assembly be concentric to each other within very close tolerances. Prior art assemblies have met this standard by manufacturing the plunger assembly from two pieces which are joined together by screw threads. It was thought that stock tubular blanks could be more easily assembled this way, and then, the combined sections could be brought down to required, finished diameter tolerances by an additional turning operation after the two parts are assembled together. However, this method of manufacture is somewhat difficult to carry out, and any movement of one portion of the plunger assembly to another during final machining may result in a product which must be rejected. Also, the assembling of two parts to make up the plunger assembly resulted in occasional misalignment of the two parts during actual usage, causing a failure of ring bearings which are intended to position the plunger assembly within a tubular casing. The present invention overcomes the inherent problems of multiple-piece assemblies by forming the entire plunger assembly from a single blank of material. The plunger assembly which is produced in accordance with this invention is more reliable and less likely to become disassociated or misaligned in actual use. In manufacturing a single piece plunger assembly, the outside surface of a cylindrical blank is machined after internal boring to reduce a major length of the blank to a preferred diameter. However, the machining step is carried out only for a major portion of the length of the blank so as to leave an excess thickness of material at an end of the blank which is remote from the end which contains the closed wall portion. Then, the outside and internal diameters of the open end of the blank are simultaneously reduced, to meet Defense Department requirements for configuration, by a pressure forging step which applies pressure radially inwardly towards the central longitudinal axis of the blank in the area of the excess thickness of material.

Thus, there is produced an improved pneumatic equilibrator having a unitary plunger assembly which meets all requirements for such assemblies. Also, an integral end wall is formed in the plunger assembly without any mechanical treatment of a blank which would cause the crystalline structure of the end wall material to become rearranged so as to allow leakage therethrough.

These and other advantages of this invention will become apparent in the more detailed discussion which follows, and in that discussion reference will be made to the accompanying drawings as briefly described below.

BRIEF DESCRIPTION OF DRAWINGS

FIG. 2 is a cross sectional view along the length of a typical prior art equilibrator assembly which meets present day Defense Department requirements;

FIG. 3 is a cross sectional view along the length of an improved plunger assembly which can be manufactured in accordance with this invention and substituted for the plunger assembly shown in the equilibrator assembly of FIG. 1;

DETAILED DESCRIPTION OF INVENTION

Figure 1:
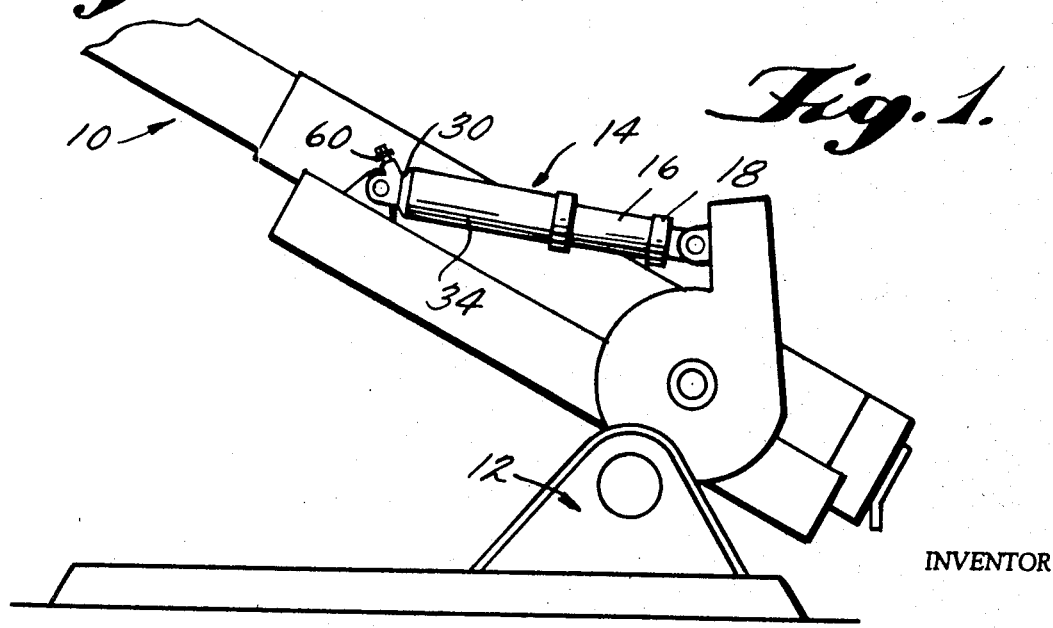
FIG. 1 is a schematic view of a gun mounted in a carriage so as to illustrate the use of a pneumatic equilibrator to assist in balancing the gun.

Referring to FIG. 1, a gun 10 is schematically illustrated in a mounted position in a carriage means 12. The carriage means 12 may comprise a platform with mounting trunnions, of the type that might be used for fixed gun implacements, or it may consist of a wheeled carriage means for field use. A pneumatic equilibrator 14 is illustrated in a typical position wherein one end of the equilibrator is operatively connected to a portion of the gun while an opposite end is operatively connected to a portion of the carriage means. Of course, intermediate linkages may be interposed between the ends of the equilibrator, and the gun and carriage to which it is connected, but FIG. 1 illustrates the general arrangement. The equilibrator 14 functions to assist in the balancing of a gun which is necessarily mounted in an out-of-balance condition for universal use in both high and low elevation firing. As is well known, an equilibrator functions somewhat as a pneumatic spring means, and pneumatic equilibrators have been used for a long time for this purpose. One or more of the equilibrators 14 can be connected to any given gun and carriage combination to support some of the weight of the gun.

FIG. 2 illustrates a prior art type of pneumatic equilibrator which has been in use for approximately twenty-five years but which meets present day Defense Department requirements for devices of this type. In fact, there is a reluctance on the part of the Defense Department to make any changes in structure, configuration, or operation of the device shown in FIG. 2 because this prior art device cannot be easily changed without creating serious problems in manufacture or in function. The discussion which follows will describe some of the well known features of the prior art device shown in FIG. 2, and then, there will be a discussion of the improvements of the present invention, as illustrated in FIGS. 3 through 6.

The equilibrator assembly which is illustrated in FIG. 2 is known as a pneumatic type of equilibrator, and it is this type of equilibrator that is of special concern to this invention. A pneumatic equilibrator includes an outer tubular casing 16 having an end cap 18 secured thereto, and the end cap 18 carries a bracket means 20 for pinning, or othewise fastening, that end of the equilibrator to a gun carriage mount. A tubular plunger assembly 22 is concentrically received within the tubular casing 16 so that the plunger assembly can slide relative to the casing in opposite directions along the central longitudinal axis of the equilibrator assembly. The plunger assembly 22 is made up of three basic parts in prior art assemblies, and these parts include a tube 24 which is secured to a larger diameter tube 26 having an end piece 28. When the three elements 24, 26, and 28 are assembled, there is formed a plunger assembly which is open at one end and which includes a closed wall 28 adjacent to an opposite end. The entire plunger assembly 22 reciprocates back and forth within the tubular casing 16 when a gun is elevated or lowered within its carriage. The basic elements 24, 26, and 28 which have been just described are of special concern to the present invention and will be defined collectively as the plunger assembly 22 for the type of pneumatic equilibrator shown in FIG. 2. However, it is to be understood that the equilibrator and the plunger assembly itself include additional structural details which will be reviewed briefly below for purposes of describing the general environment of the present invention.

Referring again to FIG. 2, it can be seen that the plunger 22 carries an end cap portion 30 which is secured to an open end of the plunger assembly to reciprocate with reciprocal movements of the elements 24, 26, and 28. The end cap portion 30 carries a bracket 32 for being secured to a portion of a gun, and also, an outer sleeve member 34 is carried by the end cap portion 30 to slide over the outside cylindrical surface of the tubular casing 16. The sleeve member 34 functions to maintain internal parts of the equilibrator in a sealed and clean condition from an external environment. The complete equilibrator assembly includes a number of sealing and bearing rings located between the tubular casing 16 and the movable plunger assembly 22 and its attached parts. The sealing and bearing structures are old and well known in this art and do not form a separate part of the present invention. However, they are illustrated in a general way in FIG. 2, and those familiar with equilibrator assemblies will recognize the structure and functions of the ring assemblies 36, 38, 40, 42, 44, and 46. The ring assemblies 36, 38, and 40 do not move with reciprocations of the plunger assembly 22 whereas the ring assemblies 42, 44, and 46 do move with reciprocations of the plunger assembly. In addition, sealing ring members 48 and 50 are provided at each end of the equilibrator to maintain all working parts in a fluid sealed condition. The sealing ring assembly 48 is secured to an open end portion of the tubular casing 16 so as to remain fixed with the position of the casing 16, and the sealing ring portion 50 is secured to an end of the plunger assembly 22 so as to reciprocate with reciprocal movements of the plunger assembly. The sealing ring assemblies 48 and 50 are provided with inlet valve devices 52 and 54 for admitting oil into the chambers 56 and 58. The chambers of oil at opposite ends of the equilibrator provide for a dampening of extreme movements of the plunger assembly relative to the tubular casing 16. Finally, the plunger assembly itself is provided with a gas inlet valve member 60 which communicates with the internal chamber 62 of the plunger assembly, and the valve member 60 functions to admit nitrogen gas under pressure into the interior of the equilibrator. Passageways 64 are formed in a portion of the plunger assembly 22 so as to allow nitrogen gas under pressure to pressurize an annular chamber 66 of the equilibrator. It can be seen that with the annular chamber 66 under pressure, there is a normal tendency of the plunger assembly to move to a fully closed position (towards the right in FIG. 2), as illustrated. This movement is a result of a force exerted by the gas pressure acting in an area defined between the inner diameter of the casing 16 and the outer diameter of the plunger assembly 22. Such force exerts a pressure against the exposed portion of the fixed annular surface 68 of the ring assembly 40 and against the movable annular surfaces 70 of the movable ring assembly 42 and of the plunger assembly. Movement of the ring assembly 42 carries the entire plunger assembly along with it. It can be appreciated that the equilibrator which has been just discussed is connected to a gun and carriage in such a way that the tendency of the equilibrator to move to a closed position, as illustrated in FIG. 2, can be used to offset some of the weight of the out-of-balance gun.

FIGS. 3 through 6 illustrate the improvements of the present invention as applied to the prior art type of equilibrator shown in FIG. 2. FIG. 3 shows the improved plunger assembly 22 formed as a unitary, monolithic structure having no seams or weld lines or separate parts. The unitary structure of this invention is intended to replace the elements 24, 26, and 28 of previous equilibrator assemblies, and the plunger assembly of this invention is fully interchangeable with prior art assemblies already in use. As discussed above, there is no requirement for carefully assembling and aligning separate tubular elements 24 and 26, as is necessary with the arrangement shown in FIG. 2, with the unitary structure of the present invention, and further, the end wall portion 28 is not subject to leakage or disassociation since it is formed as an integral part of the entire plunger assembly. However, it is important that the entire plunger assembly of the present invention be manufactured from a forging grade of steel or other material, which is not subjected to any treatments resulting in a rearrangement of crystalline structure that could give rise to gas leakage through the material itself. Accordingly, it is important to select known materials of forging grade quality for the manufacture of the improved plunger assembly of this invention, and also, it is desirable to manufacture the plunger assembly in accordance with the method discussed below so as to avoid any mechanical treatment of the material which would give rise to it becoming pervious to gas under pressure.

Figure 4:
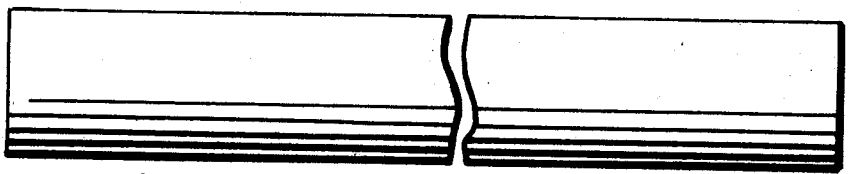
FIG. 4 is a view of a cylindrical blank which may be used as the starting point for the process of the present invention.
Figure 5:
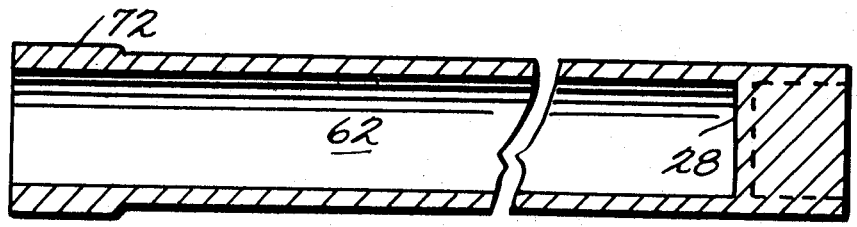
FIG. 5 is a cross sectional view of the cylindrical blank of FIG. 4 after it has been internally bored and externally machined to desired diameters.
Figure 6:
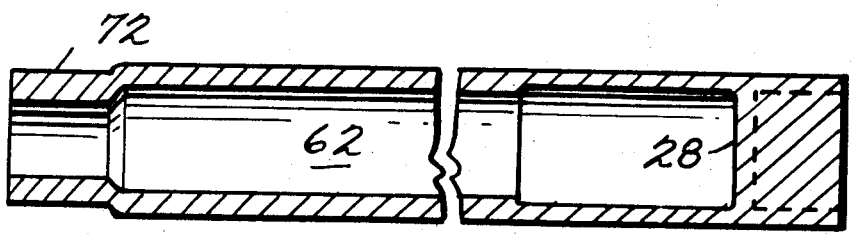
FIG. 6 is a view similar to FIG. 5, showing a final step of reducing inside and outside diameters of an open end portion of the blank of FIG. 5.

FIGS. 4 through 6 illustrate steps in forming the improved unitary plunger assembly of this invention. FIG. 4 shows a cylindrical blank of solid material prior to any machining or other treatment. In order to form the closed end wall 28 of the plunger assembly in a position which is adjacent to one end of the blank, the interior of the FIG. 4 blank is bored out by known boring techniques. As shown in FIG. 5, a first boring is made from one end of the blank for a major length of the blank along a central longitudinal axis of the cylindrical blank of material. Also, a second boring is made from an opposite end of the same blank so as to leave a required thickness of material to define the closed end wall 28 of the plunger assembly. Both borings may be carried out prior to any subsequent steps of forming the plunger assembly or it may be desired to form the smaller length boring only after additional steps have been carried out. FIG. 6 also illustrates that a portion of the longer boring is enlarged by known techniques, to meet Defense Department requirements for configuration of plunger assembly structures. Then, the outside surface of the blank is machined down to a desired diameter by turning the assembly in a lathe, or by any other machining technique, for a major length of the blank. However, an excess diameter of material is allowed to remain at 72 for purposes of forming a reduced internal diameter for the open end of the plunger assembly, as shown in FIG. 6. It has been found that the reduced diameter requirements for such assemblies cannot be precisely met by merely boring out the plunger to the varying diameters which are required, and therefore, it is necessary to leave an excess of material at 72 for working the end of the plunger down to the form shown in FIG. 6. FIG. 6 illustrates the final form of the plunger assembly wherein the excess diameter portion 72 has been worked down to simultaneously reduce outside and inside diameters of the open end of the plunger assembly. This is accomplished by known forging techniques which apply pressure radially inwardly around the circumference of the portion 72 so as to work the material down to the configuration and dimensions that are required.

In a typical example of construction, the final form of the plunger assembly, as shown in FIG. 3, has three internal diameters which progressively decrease in size from 3⅝ inches, to 3⅛ inches, to 2⅛ inches at the open end of the plunger assembly. The unitary structure is formed from a known steel of forging quality which is impervious to nitrogen gas under pressure, and typically the equilibrator assembly can pass a leakage test which would apply approximately 3300 pounds of nitrogen pressure per square inch at a temperature of 60° F. when the equilibrator is extended in a neutral position. Such a standard would be established for a relatively large gun, and lower pressure requirements would be met for lighter weight guns. Examples of forging quality steel that have been used include 4140 (or 8640)–QQ–S–624 (military specification).

What I claim is:
1. A process for forming a portion of a plunger assembly as a unitary structure for use in a pneumatic equilibrator, comprising the steps of
  forming a solid cylindrical blank of forging quality steel,
  boring internal openings of unequal length into opposite ends of said cylindrical blank and along its longitudinal axis so as to leave a closed wall portion transversely across the blank and near one end of the blank,
  machining the outside surface of said cylindrical blank to reduce a major length of the cylindrical blank to a preferred diameter, said machining step being carried out so as to leave an excess thickness of material at an end of the blank which is remote from said closed wall portion, and
  simultaneously reducing the outside and internal diameters of said end of the blank which is remote from the closed wall portion by forging said excess thickness of material radially inwardly towards the central longitudinal axis of the blank by an application of pressure on the outside surface of the blank.
2. The process of claim 1 wherein the longer internal opening which is formed in said cylindrical blank is formed with two different internal diameters before carrying out said reducing step.

References Cited
UNITED STATES PATENTS

| | | | |
|---|---|---|---|
| 1,695,496 | 12/1928 | Jacques | 29—157.1 |
| 1,870,970 | 8/1932 | Stevenson | 29—558X |
| 2,170,811 | 8/1939 | Cornell, Jr. | 29—558X |
| 2,807,001 | 9/1957 | Demarkles et al. | 339—255 |

JOHN F. CAMPBELL, Primary Examiner
V. A. DIPALMA, Assistant Examiner